(12) United States Patent
Justak

(10) Patent No.: US 9,132,922 B2
(45) Date of Patent: Sep. 15, 2015

(54) RAM AIR TURBINE

(75) Inventor: John F. Justak, Stuart, FL (US)

(73) Assignee: Advanced Technologies Group, Inc., Stuart, FL (US)

( * ) Notice: Subject to any disclaimer, the term of this patent is extended or adjusted under 35 U.S.C. 154(b) by 894 days.

(21) Appl. No.: 13/114,603

(22) Filed: May 24, 2011

(65) Prior Publication Data

US 2012/0301290 A1 Nov. 29, 2012

(51) Int. Cl.
*F04D 29/44* (2006.01)
*B64D 41/00* (2006.01)
*F03D 9/00* (2006.01)

(52) U.S. Cl.
CPC ............... *B64D 41/007* (2013.01); *F03D 9/00* (2013.01); *F05B 2220/31* (2013.01); *Y02E 10/72* (2013.01)

(58) Field of Classification Search
CPC ............. B64D 41/007; F05D 2220/10; F03B 2220/10; F03B 2220/31; F03D 9/00; F03D 9/002
USPC .............. 415/71–73, 77, 79, 191, 194, 219.1, 415/227, 228; 416/175, 176, 177; 244/58
See application file for complete search history.

(56) References Cited

U.S. PATENT DOCUMENTS

| | | | | |
|---|---|---|---|---|
| 2,230,398 | A * | 2/1941 | Benjafield | 415/74 |
| 3,064,942 | A * | 11/1962 | Martin | 415/32 |
| 6,270,309 | B1 | 8/2001 | Ghetzler et al. | |
| 7,147,433 | B2 * | 12/2006 | Ghizawi | 415/164 |
| 2006/0018753 | A1 | 1/2006 | Menian | |
| 2007/0231141 | A1 | 10/2007 | Chaing et al. | |
| 2010/0135781 | A1 * | 6/2010 | Goto et al. | 415/208.2 |
| 2011/0033280 | A1 | 2/2011 | Justak | |

OTHER PUBLICATIONS

Logan Jr., Earl, "Handbook of Turbomachinery", 2003, Marcel Dekker Inc., p. 357.*

* cited by examiner

*Primary Examiner* — Dwayne J White
*Assistant Examiner* — Alexander White
(74) *Attorney, Agent, or Firm* — GrayRobinson, PA

(57) ABSTRACT

A ram air turbine comprises a turbine housing which mounts a number of circumferentially spaced turbine blades that function predominantly as impulse turbine blades and a number of splitters, each located in between adjacent turbine blades, which function predominantly as a reaction turbine blade but are shorter in length than the turbine blades. The cross section of the turbine housing decreases between its forward and aft ends while the height of both the turbine blades and splitters increases in the same direction such that the tips of the turbine blades and splitters collectively form a substantially cylindrical shape.

17 Claims, 10 Drawing Sheets

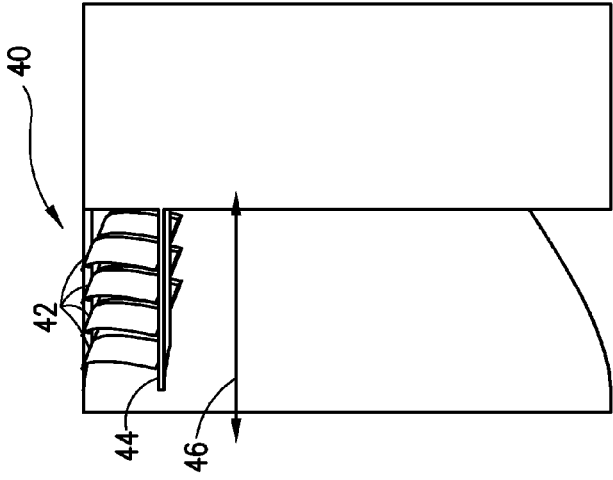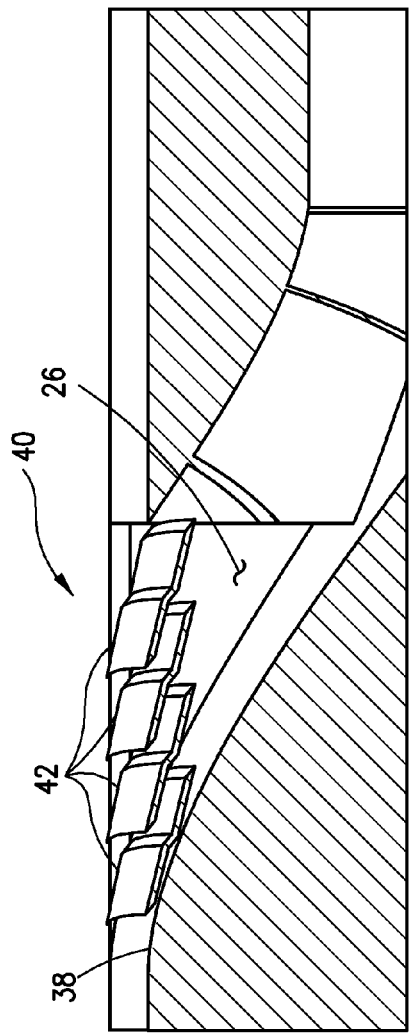

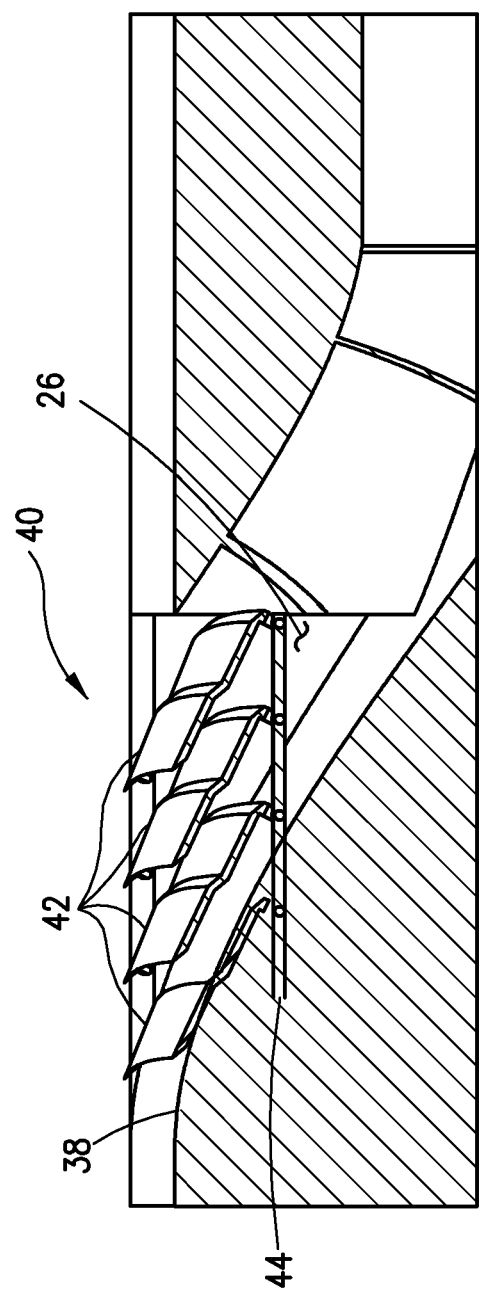

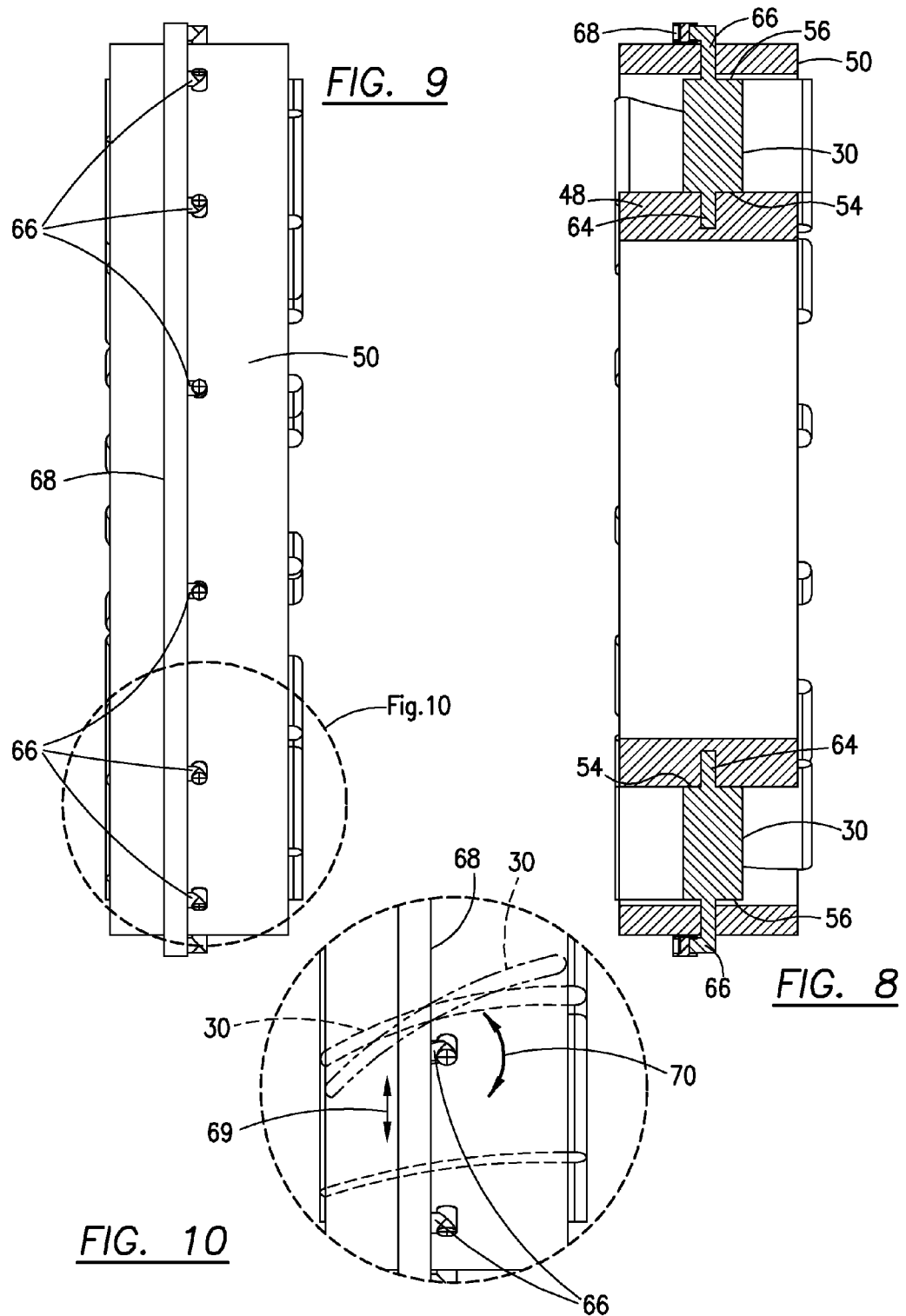

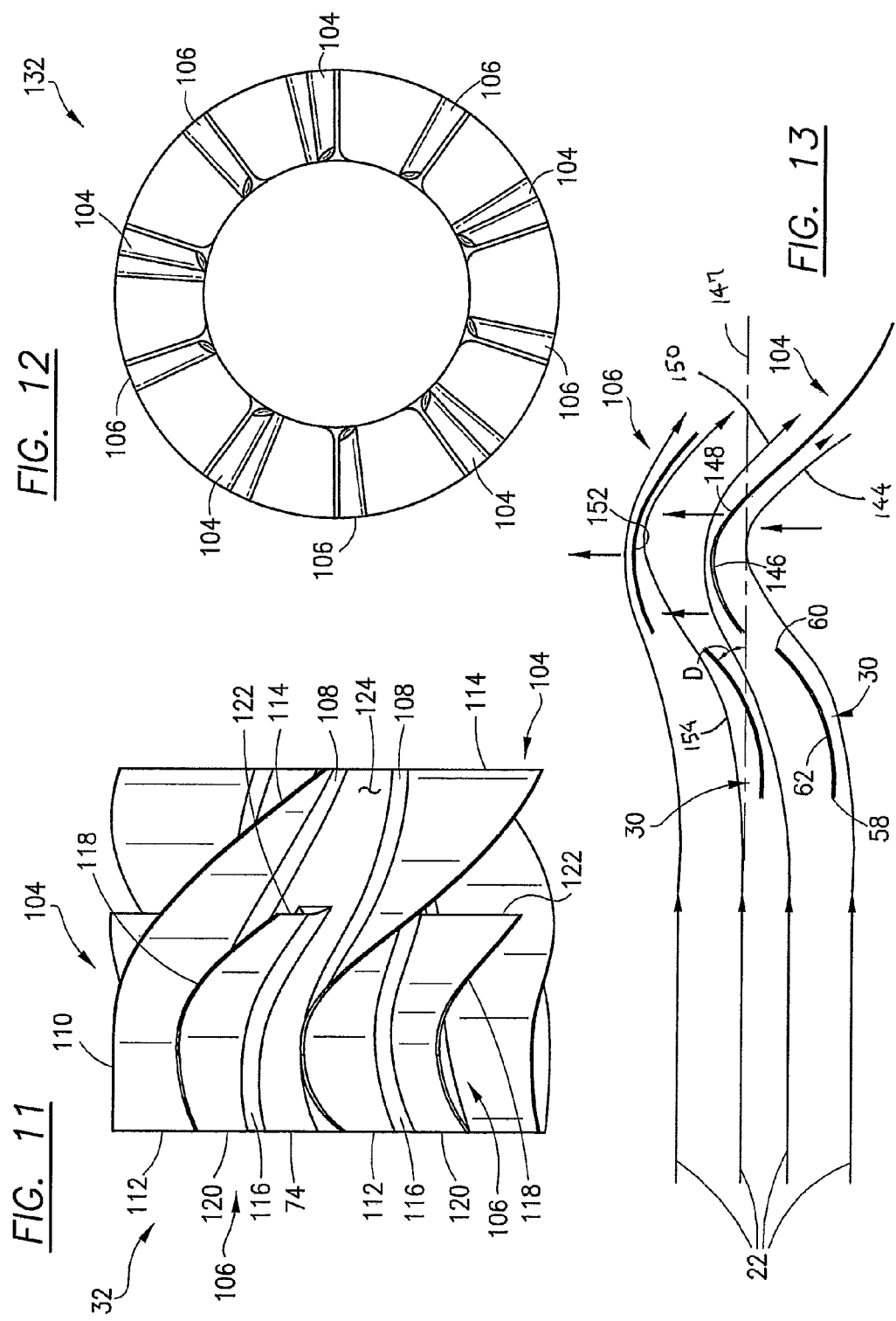

RAM AIR TURBINE

FEDERALLY SPONSORED RESEARCH

This invention was made with government support under Small Business Innovation Research Contract Nos. N68335-08-C-0276 and N68335-09-C-0313 awarded by the United States Navy. The government has certain rights in the invention.

FIELD OF THE INVENTION

This invention relates to a ram air turbine particularly adapted for use with a submerged ram air turbine generating system whose operation is based on free stream flow in which power generation is derived from the kinetic energy of a stream of fluid and the system is designed to maximize the velocity and mass flow of the fluid from a submerged inlet through adjustable exhaust panels.

BACKGROUND OF THE INVENTION

Ram air turbines are commonly used in military and commercial aircraft to provide a source of hydraulic or electrical power in the event of an emergency. Modern aircraft generate power through the main engines or via an auxiliary power unit such as a fuel-burning turbine typically located in the tail of the aircraft. In most applications for commercial aircraft, ram air turbines are retracted into the fuselage or wing(s) under normal operating conditions, but are deployed in the event of an emergency loss of power. They typically comprise two or more blades, much like windmill blades, carried by a shaft which is coupled to a generator. The blades rotate the shaft in response to contact with the air stream produced by movement of the aircraft during flight. Depending upon the size of the blades, the capacity of the electrical generator and the flight speed of the aircraft, ram air turbines can supply as much as 70 kW for use in powering flight controls, linked hydraulics and flight-critical instrumentation.

Military aircraft, particularly those designed for electronic warfare, have in the past typically used ram air turbines externally mounted to a pod to deliver power for electronic equipment employed to counter enemy air defenses using reactive and/or pre-emptive jamming techniques, to provide stand-off escort jamming, to initiate electronic attacks and to provide self-protection capability for the aircraft. A pod is essentially a generally cylindrical, aerodynamically-shaped housing mounted to the underside of the aircraft wings. More recently, submerged ram air turbines have been proposed as a replacement for externally mounted designs. The term "submerged" in this context refers to the placement of ram air turbines within the interior of pods in alignment with one or more inlets which direct a flow of air onto the blades of the turbine which is then exhausted through the pod outlet(s).

The increasing sophistication of electronic equipment employed in military aircraft has created a requirement for additional power at flight speeds of 200 to 220 knots. Existing externally mounted and submerged ram air turbines do not provide sufficient power output, and there is a need for an improved ram air turbine generating system.

SUMMARY OF THE INVENTION

This invention is directed to a ram air turbine that may be use with a submerged ram air turbine generating system, which, in one presently preferred application, is capable of generating in excess of 100 kW of power when mounted to the pod of an aircraft flying at speeds of about 220 knots and at an altitude of about 25,000 feet.

In one presently preferred embodiment, the ram air turbine comprises a turbine housing having a forward end, an aft end, and an outer surface collectively defining a hollow interior. The turbine housing decreases in cross section from its forward to aft end. A number of turbine blades, which function predominantly as impulse turbine blades, are circumferentially spaced around the outer surface of the turbine housing. A like number of splitters, each located in between adjacent turbine blades, function predominantly as a reaction turbine blade. Each of the turbine blades and the splitters have a forward end located at the forward end of the turbine housing, but while the turbine blades extend to the aft end of the turbine housing the splitters are only about one-half of the length of the turbine blades thus forming open areas near the aft end of the turbine housing between adjacent turbine blades. Each turbine blade has a blade tip and each splitter has a splitter tip, with the blade tips and splitter tips collectively form a generally cylindrical shape. The height of both the turbine blades and splitters increases from the forward end of the turbine housing toward its aft end.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 3 is a plan view of one set of louvers located in the submerged inlet of the system, depicted in the closed position;

FIG. 4 is a cross sectional, side elevational view of the louvers shown in FIG. 3 in the closed position;

FIG. 5 is a view similar to FIG. 4 except with the louvers in an open position;

FIG. 8 is a cross sectional view taken generally along line 11-11 of FIG. 10;

FIG. 9 is a side elevational view of the adjustable inlet guide vanes depicted in FIGS. 10 and 11;

FIG. 10 is an enlarged view of the encircled portion of FIG. 12 illustrating the change in angle of the inlet guide vanes in response to actuation of a control arm;

FIG. 11 is a perspective view of the hybrid ram air turbine of this invention;

FIG. 12 is an end view of the hybrid ram air turbine shown in FIG. 14;

FIG. 13 is a schematic representation of inlet guide vanes, a turbine blade and a splitter showing the deflection of an air stream by the vanes onto the blade and splitter;

DETAILED DESCRIPTION OF THE INVENTION

Figure 1:
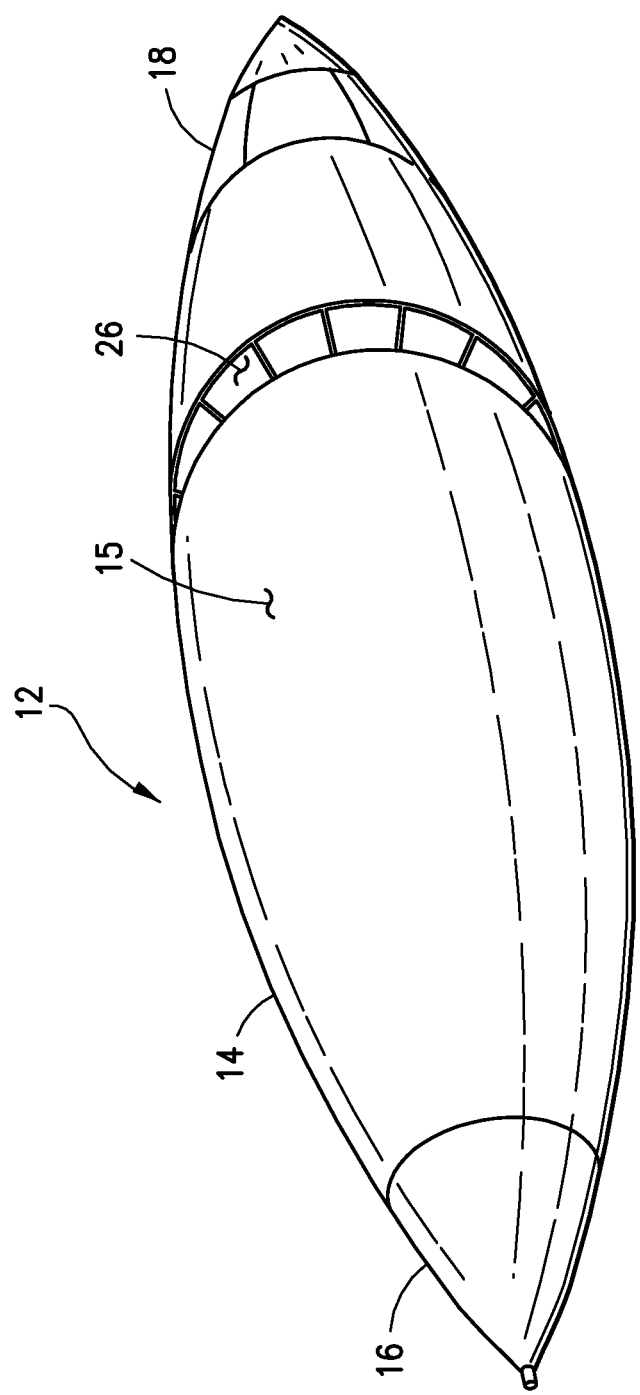
FIG. 1 is a perspective view of the submerged ram air turbine generating system of this invention in the particular application wherein it is utilized with a pod for mounting to the wing or other location on an aircraft.
Figure 2:
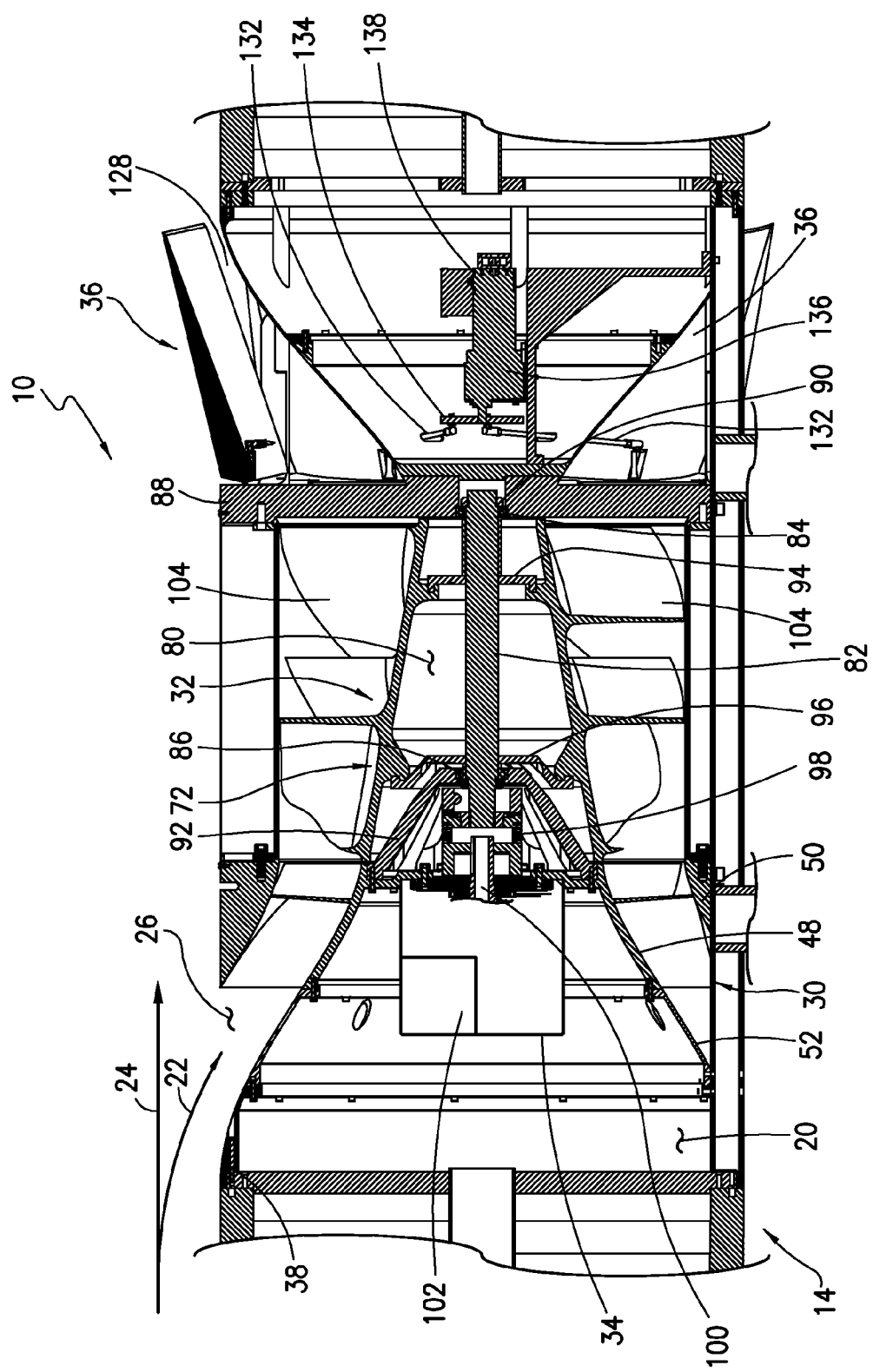
FIG. 2 is a cross sectional view of a portion of the pod shown in FIG. 1.

Referring initially to FIGS. 1 and 2, the submerged ram air turbine generating system 10 of this invention is depicted in one preferred application wherein it is incorporated into a pod 12 typically mounted to the underside of the wing of an aircraft (not shown). The pod 12 generally includes a pod housing 14 having an outer surface 15, a forward end 16, an aft end 18 and a hollow interior 20. For purposes of the present discussion, the terms "forward," "aft," "upstream" and "downstream" refer to the direction of a flow of air depicted by arrows 22 and 24 in FIG. 2. In particular, air flowing over the pod 12 during flight of an aircraft impacts the forward end 16 of the pod housing 14 first, and a portion of such flow identifies as air stream 22 enters the pod interior 20 through a submerged inlet 26 of the system 10, discussed below, while the remaining portion of the flow denoted as air stream 24 continues along the outer surface 15 of the pod housing 14. Additionally, the terms "inner," "outer," and "radially" denote spatial orientations relative to the outer surface 15 of the pod housing 14 and its hollow interior 20, i.e. the interior 20 of the pod housing 14 is located radially inwardly from its outer surface 15. It should be understood that term "radially" when used to describe positions of elements in relation to the pod 12 is not intended to be limited to a direction from the center of a circular or cylindrical shape but is applicable to essentially any shape such as oval, rectangular etc.

In addition to the submerged inlet 26, the system 10 may include a closure device in the form of adjustable louvers 42 located in the submerged inlet 26, a stator comprising inlet guide vanes 30 which may be adjustable, a hybrid ram air turbine 32 directly coupled to a permanent magnet generator 34, and, adjustable exhaust panels 36. Each of these components of system 10 is discussed separately below.

Considering initially the submerged inlet 26, reference is made to FIGS. 1 and 2. In the presently preferred embodiment, the submerged inlet 26 is located downstream from the forward end 16 of the pod 12 and not at the nose or forward end 16 as contemplated, for example, in systems of the type disclosed in U.S. Pat. No. 6,270,309. The submerged inlet 26 preferably extends around substantially the entire periphery of the outer surface 15 of the pod housing 14, e.g. up to 360° in the configuration of pod 12 illustrated in the drawings. It includes a curved inlet opening 38 located at the outer surface 15 of the pod housing 14 which is effective to resist flow separation of the air stream 22 as it enters the pod interior 20. Preferably, the cross sectional area of the submerged inlet 26 converges or decreases from the curved inlet opening 38 to the area of the inlet guide vanes 30 where it terminates. Accordingly, the term "submerged inlet" as used herein means a passageway extending into the interior of the pod housing 14, preferably but not necessarily converging in cross section, having an entrance defined by the curved inlet opening 38 which is substantially flush with outer surface 15 of the pod housing 14 at a point of maximum diameter of the pod housing 14. As such, the submerged inlet 26 is not visible when viewing the pod housing 14 from the forward end or aft end, and it is not exposed to ram air. This construction is in contrast to many conventional ram air turbine systems in which one or more inlets project outwardly from the outer surface of the housing or other structure within which the ram air turbine is enclosed, or wherein the inlet is located at the nose of the housing.

Referring now to FIGS. 3-5, a closure device in the form of a number of sets 40 of louvers 42 is mounted in the submerged inlet 26. One set 40 of louvers 42 is shown in the Figs., it being understood that a number of other groups or sets 40 of louvers 42 are circumferentially spaced along the entire extent of the submerged inlet 26. As schematically depicted in the drawings, the individual louvers 42 within each set 40 are oriented side-by-side and connected at one edge to a control rod 44. The control rod 44 is movable in the direction of arrow 46 shown in FIG. 3 to cause the louvers 42 to move between a closed position depicted in FIG. 4 and an open position shown in FIG. 5. A separate control rod 44 is employed for each set 40 of louvers 42, and the control rods 44 may be collectively actuated by a motor and drive mechanism (not shown) or other suitable means.

Figure 6:
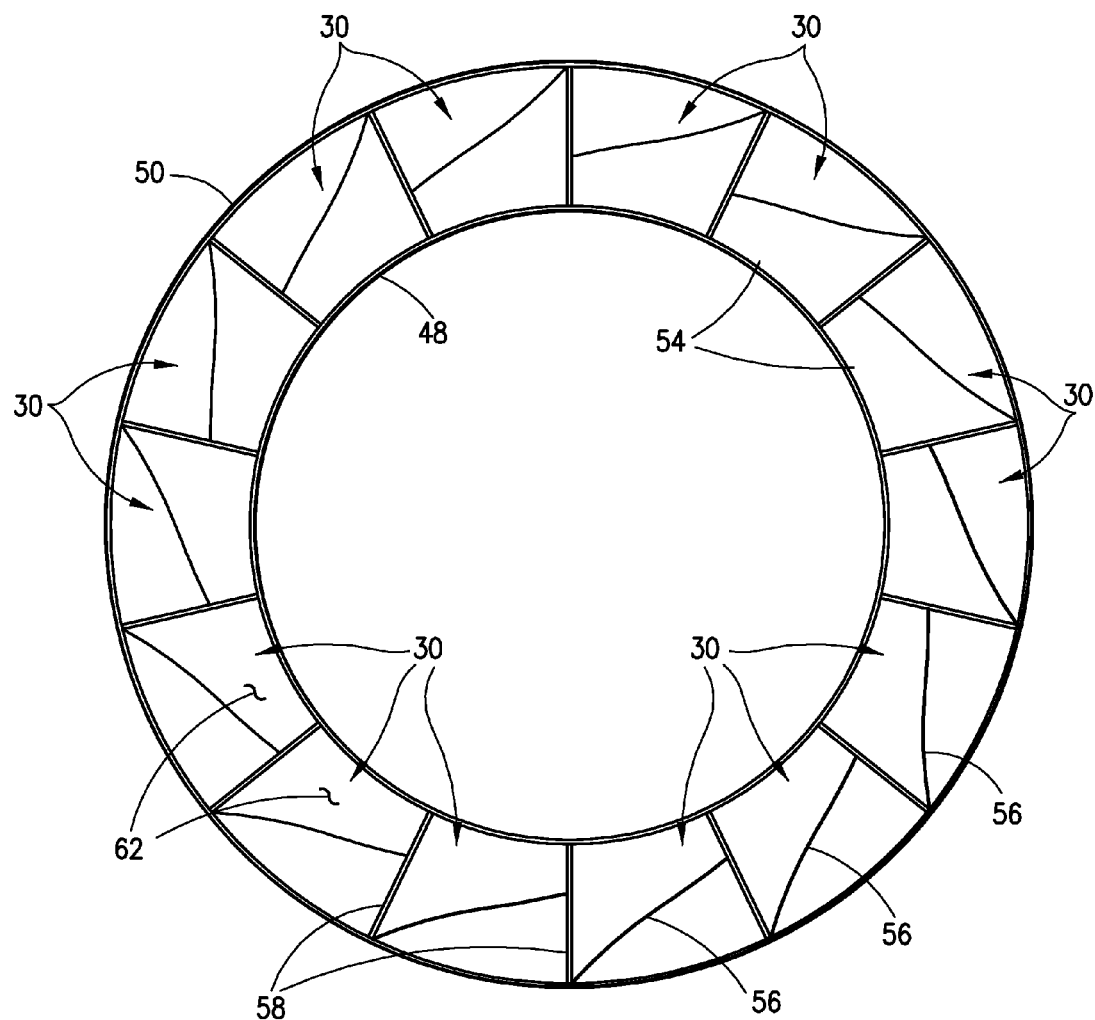
FIG. 6 is an end view of the inlet guide vanes as viewed from the upstream end of the hybrid ram air turbine.
Figure 7:
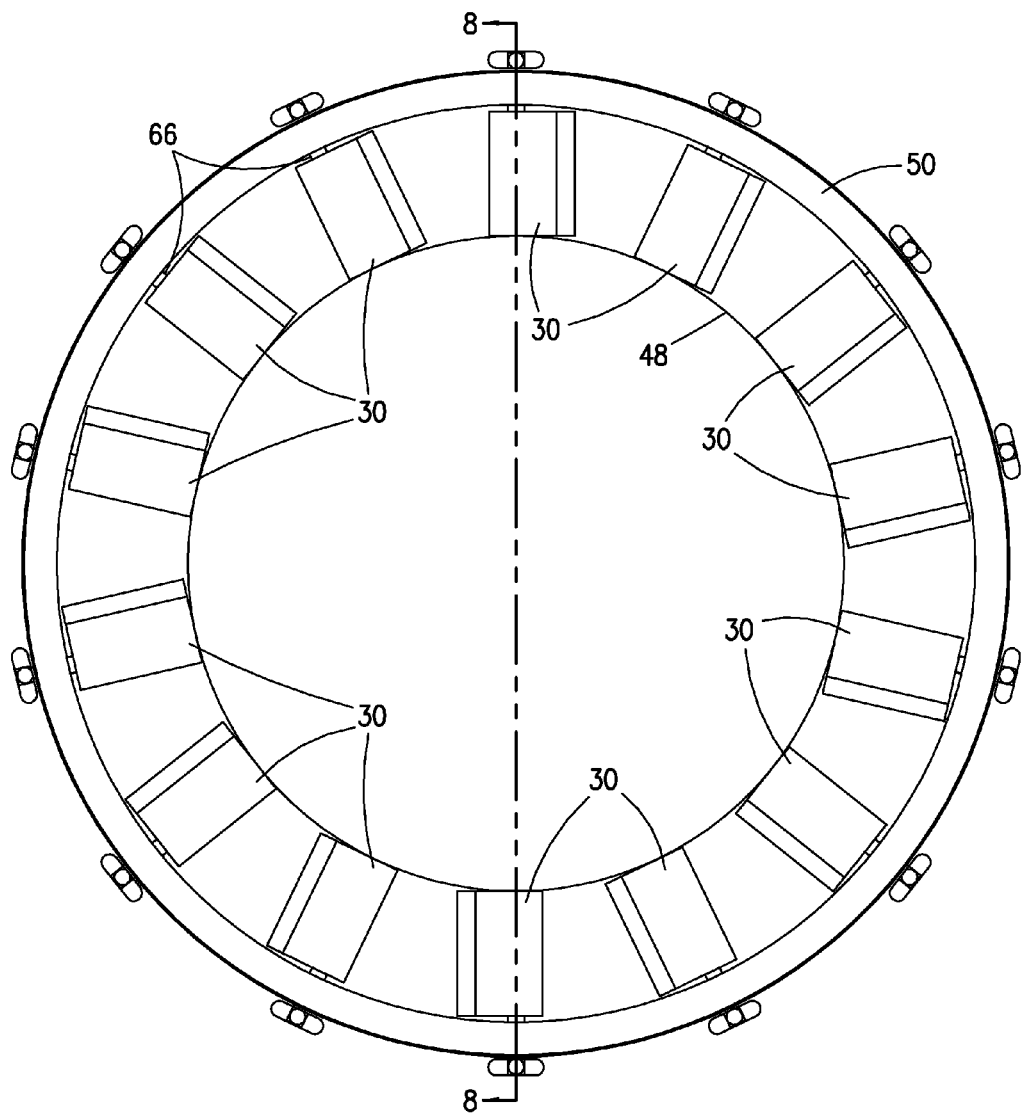
FIG. 7 is an end view of an alternative embodiment of the inlet guide vanes wherein the angle of such vanes is adjustable.
Figure 14:
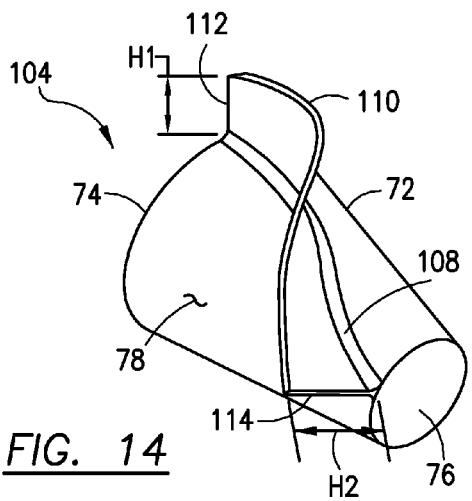
FIG. 14 is a perspective view of the hybrid ram air turbine of this invention in which a single turbine blade is shown.
Figure 15:
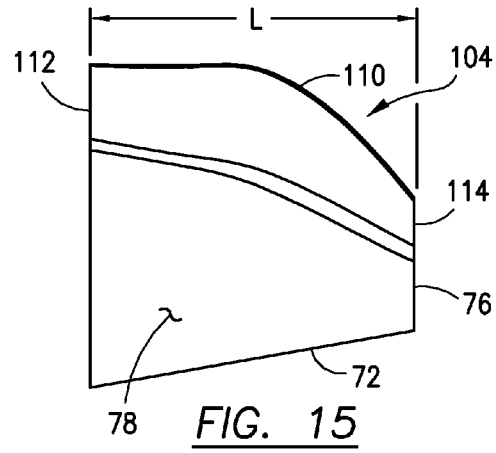
FIG. 15 is a side elevational view of FIG. 14.

The inlet guide vanes 30 are illustrated in more detail in alternative embodiments shown in FIG. 6, and in FIGS. 7-10. In both of these embodiments, the inlet guide vanes 30 act as a stator to direct the air stream 22 onto the ram air turbine 32. In FIG. 6 the guide vanes 30 are fixed, whereas in FIGS. 7-10 their angle may be adjusted, as described below.

Referring initially to FIG. 6, a number of inlet guide vanes 30 are circumferentially arranged between an inner ring 48 and an outer ring 50. As best seen in FIG. 2, the inner ring 48 is connected to a bracket 52 secured to the pod housing 14 and the outer ring 50 is directly connected to the pod housing 14. Each of the vanes 30 has an inner edge 54 affixed to the inner ring 48, an outer edge 56 mounted to the outer ring 50, a leading end 58 and a trailing end 60. See also FIG. 13. In the presently preferred embodiment, each of the vanes 30 decreases in height, i.e. the dimension between the inner and outer edges 54, 56 thereof, in a direction from the leading end 58 to the trailing end 60. The vanes 30 each have a dished or cup-shaped surface 62 extending between their leading and trailing ends 58, 60, and they are oriented at an angle with respect to the air stream 22 as described more fully below in connection with a discussion of the operation of the system 10 and FIG. 13.

In the alternative embodiment illustrated in FIGS. 7-10, the inlet guide vanes 30 may be adjusted in such a way as to vary the angle at which their dished surfaces 62 are oriented relative to the air stream 22 and the hybrid ram air turbine 32. See also FIG. 13 and the discussion below. Each of the vanes 30 has the same configuration as that depicted in FIG. 6, with inner edge 54 mounted by a shaft 64 to inner ring 48 and outer edge 56 mounted on a shaft 66 to outer ring 50. A control arm 68 extends along the outer ring 50 and is connected to each of the shafts 66. The control arm 68 is movable in a circumferential direction as indicated by the arrow 69 in FIG. 10 causing the vanes 30 to pivot on shafts 64, 66 in the direction of arrow 70 to an extent illustrated by the two positions of vanes 30 depicted in phantom lines in FIG. 10. The control arm 68 may be moved by a mechanical connection to a motor (not shown) or other suitable means.

Referring now to FIGS. 2 and 11-18, the hybrid ram air turbine 32 of this invention is illustrated. The turbine 32 comprises a turbine housing 72 having a forward end 74, an aft end 76, an outer surface 78 and a hollow interior 80. The cross section of the turbine housing 72 decreases in a direction from the forward end 74 to the aft end 76 forming an essentially frusto-conical shape. As best seen in FIG. 2, a turbine shaft 82 is centrally mounted within the housing interior 80 on a rear bearing 84 at one end and a forward bearing 86 at the opposite end. The rear bearing 84 is carried on a support plate 88 connected to the pod housing 14, and is held in place on the turbine shaft 82 by a locking ring 90. The forward bearing 86 is mounted to a forward bearing support 92, which, in turn, is connected to the inner ring 48 which supports the inlet guide vanes 30. The forward bearing 86 is also held in place on the turbine shaft 82 by a locking ring 90. The turbine housing 72 is connected to the turbine shaft 82, so that they rotate in unison, by an aft turbine bracket 94 and a forward turbine bracket 96.

In the presently preferred embodiment, the turbine shaft 82 is directly connected by a flex coupling 98 to the input shaft 100 of generator 34. No gear box, lubrication system or other interface connection between turbine shaft 82 and generator 34 is required. The generator 34 is supported in position relative to the turbine shaft 82 by the inner ring 48. As noted above, the generator 34 is preferably a permanent magnet generator, although it is contemplated that other types of generators may be employed. Additionally, as schematically depicted in FIG. 2, power control electronics 102 may be coupled to or integrated with the generator 34 to supply a constant voltage output to electronic devices (not shown) typically located in the forward end 16 of the pod 12. The power control electronics 102 are effective to either boost or buck the voltage output of the generator 34 independently of the torque and/or shaft speed of the turbine 32. Details of the generator 34 and power control electronics 102 form no part of this invention and are therefore not discussed herein.

The hybrid ram air turbine 32 of this invention is formed with a number of turbine blades 104 which are circumferentially spaced about the turbine housing 72, and a number of splitters 106 each located in between adjacent blades 104. Each of the blades 104 comprises a blade root 108 connected to or integrally formed with the turbine housing 72, a blade tip 110 radially outwardly spaced from the blade root 108, a forward end 112 and an aft end 114. The blades 104 extend the entire length of the turbine housing 72, e.g. from its forward end 74 to the aft end 76. Each of the splitters 106 comprises a splitter root 116 connected to or integrally formed with the turbine housing 72, a splitter tip 118 radially outwardly spaced from the splitter root 116, a forward end 120 and an aft end 122. Each splitter 106 extends from the forward end 74 of the turbine housing 72 to a terminal location spaced from its aft end 76, preferably about 50% to 60% of the total length of the blades 104, thus forming an open area 124 between adjacent blades 104 where each splitter 106 terminates. See FIG. 11.

In the presently preferred embodiment, the blade tips 110 of the blades 104 and the splitter tips 118 of the splitters 106 collectively form a generally cylindrical shape from the forward end 74 of the turbine housing 72 to its aft end 76. Consequently, the height dimension of the blades 104, as measured between the blade roots 108 and blade tips 110, and the height dimension of the splitters 106, as measured between the splitter roots 116 and splitter tips 118, increases from the forward end 74 of the turbine housing 72 to its aft end 76 by the same amount as the cross sectional area of the turbine housing 72 decreases in that direction. Compared to prior art turbines, the hybrid ram air turbine 32 of this invention has a high cord to diameter ratio. The term "cord" as used herein refers to the length of the blade root 108 of blades 104 along the turbine housing 72, and "diameter" refers to the diameter of the turbine housing 72. A specific example of this dimensional relationship is given below with reference to a discussion of FIGS. 14-18.

The geometry of the turbine blades 104 is generally similar to that of blades used in a radial turbine in which fluid flow is directed radially onto the blades and exits axially, but in this invention the turbine blades 104 are impacted by an axial flow of the air stream 22. The turbine blades 104 are shaped to act predominantly as an impulse turbine blade. The splitters 106, on the other hand, are shaped to function predominantly as a reaction turbine blade. They allow for maximum torque or work out, while minimizing the drag torque or parasitic loss. A further description of the blade 104 and splitter 106 geometry is provided below in connection with a discussion of the overall operation of the system 10.

Figure 17:
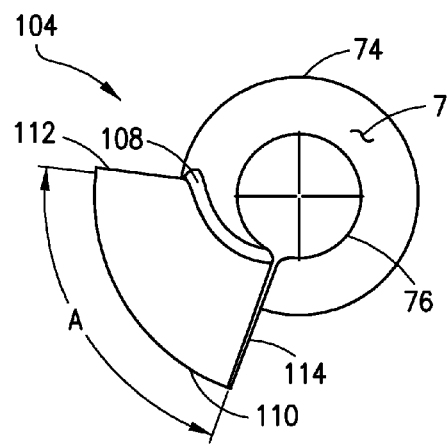
FIG. 17 is an end view of FIG. 14, as seen from the aft end of the hybrid ram air turbine.
Figure 16:
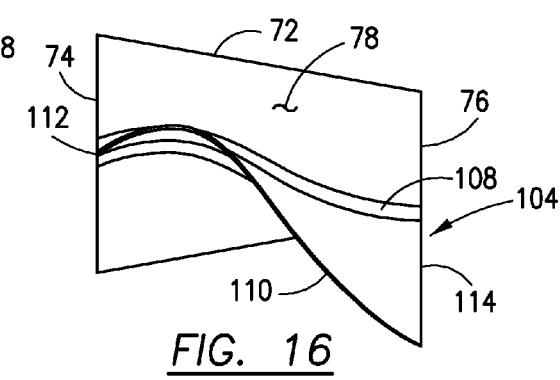
FIG. 16 is a plan view of FIG. 14.
Figure 18:
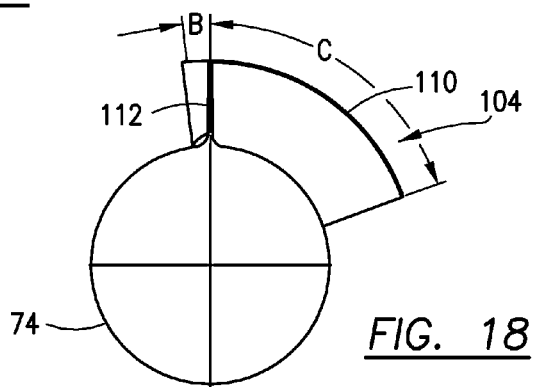
FIG. 18 is an end view of FIG. 14, as seen from the forward end of the hybrid ram air turbine.

One presently preferred embodiment of the turbine blades 104 of this invention is depicted in FIGS. 14-18 wherein a single blade 104 is shown in position on the turbine housing 72 for ease of illustration and description. In this embodiment, the diameter of the turbine 32 is 25 inches (63.5 cm) which includes both the turbine housing 72 and the blades 104 and splitter 106, and the length "L" of the turbine 32 is 20 inches (50.8 cm). Consequently, the length of each turbine blade 104 is 20 inches (50.8 cm), and the length of each splitter 106 is about 10 inches (25.4 cm). The height H1 of the blades 104 at the forward end 74 of the turbine housing 72, measured between the blade root 108 and blade tip 110, is 4.8 inches (12.2 cm) and the height H2 at the aft end 76 is 8.4 inches (21.3 cm). See FIG. 14. The angle "A" formed by the blade 74 viewing it from the aft end 76 of the turbine housing 72 is about 76.5°, as shown in FIG. 17. Viewing the blade 104 from the forward end 74 of the blade housing 72, as depicted in FIG. 18, two angles "B" and "C" are presented wherein angle B is about 6.5° and angle C is about 70.5°. Given these dimensions of the turbine housing 72 and blades 104, there are preferably a total of five (5) blades 104 circumferentially spaced about the turbine housing 104 and five (5) splitters 106 each located in between two adjacent blades 104. Further, there are preferably a total of fourteen (14) inlet guide vanes 30 employed to direct the air stream 22 to the blades 104 and splitters 106. However, it is contemplated that other numbers of inlet guide vanes 30 could be employed so long as the total number is different than that of the blades 104 and splitters 106 combined to ensure that only one inlet guide vane 30 aligns with one of the blades 104 or splitter 106 at any given time thus preventing acoustic resonance.

Figure 19:
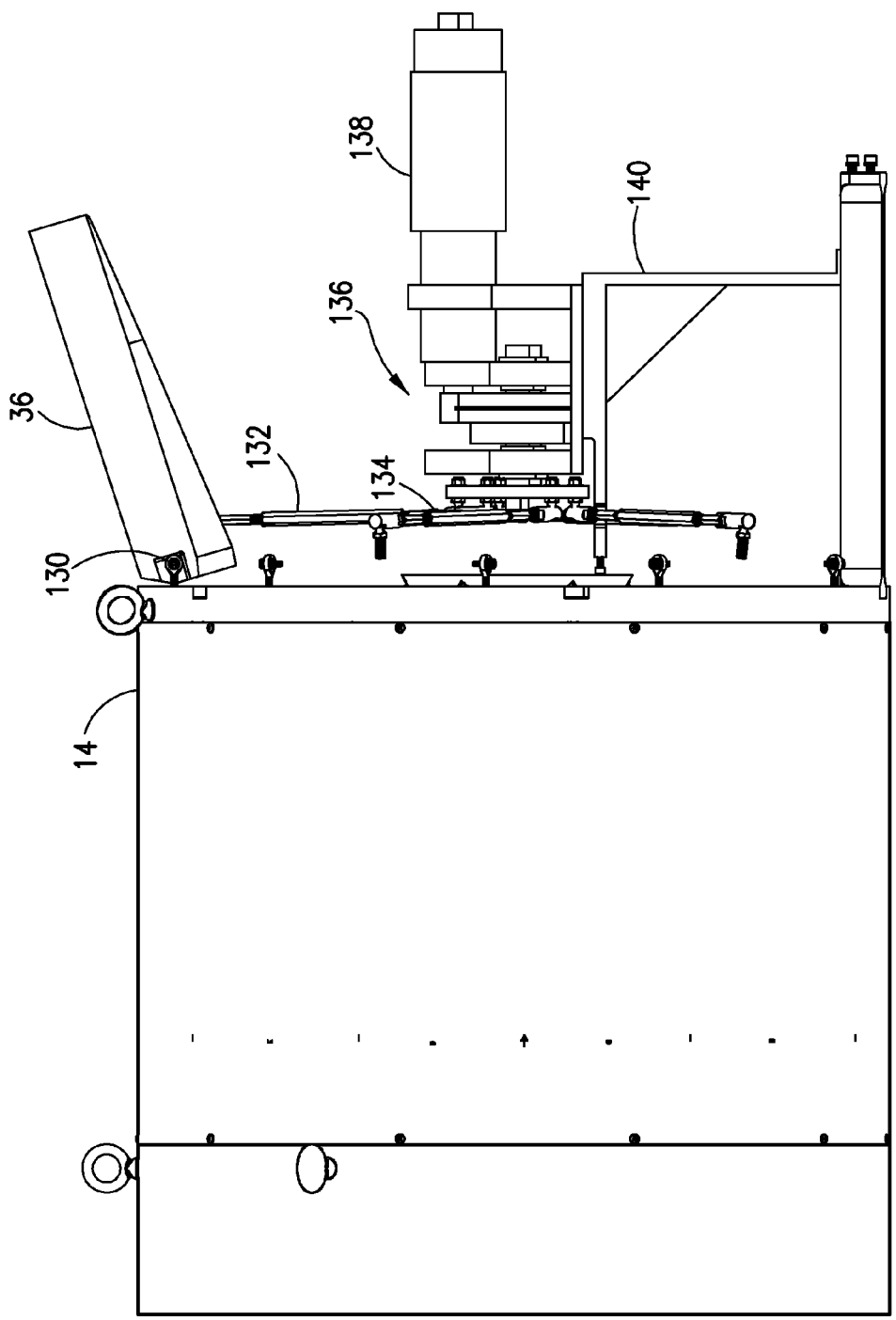
FIG. 19 is a partial view of the aft portion of the submerged ram air turbine generating system of this invention depicting one of the exhaust panels and its connection to a drive motor via a gear reducer and actuator ring.

Referring now to FIGS. 2 and 19, the adjustable exhaust panels 36 of this invention are illustrated in more detail. In the presently preferred embodiment, a number of exhaust panels 36 are located downstream from the turbine 32 in a position to move between an open position and a closed position with respect to one or more exhaust openings 128 which extend substantially entirely about the outer surface 15 of the pod housing 14. One end of each exhaust panel 36 is connected by one or more hinges 130 to the pod housing 14. A pivot arm 132 is connected at one end to each exhaust panel 36, and at the opposite end to an actuator ring 134. The actuator ring 134, in turn, is coupled to the output of gear reducer 136 driven by a motor 138. The motor 138 and gear reducer 136 may be mounted within the pod housing 14 by a support 140.

In response to operation of the motor 138 and gear reducer 136, the actuator ring 134 is rotated in a clockwise or counterclockwise direction. In one direction of rotation of actuator ring 134, each pivot arm 132 is moved radially outwardly causing the exhaust panels 36 to which it is connected to pivot outwardly from a "closed" position, i.e. a position in which the exhaust panels 36 rest against the outer surface 15 of the pod housing 14 and close the exhaust opening(s) 128. It is contemplated that the exhaust panels 36 may be configured to overlap with one another when in the closed position to improve the seal made with the exhaust opening(s) 128. In the presently preferred embodiment, the exhaust panels 36 may be moved to an open position, by rotation of the actuator ring 134 in the opposition direction, wherein an angle of up to about 30° is formed relative to the outer surface 15 of the pod housing 14. For purposes of the present discussion, the term "open position" refers to any amount of spacing between the exhaust panels 36 and the outer surface 15 of the pod housing 14 up to an angle of about 30°.

Having described the structural features of the system 10, its method of operation is now discussed. As an overview, system 10 is designed to maximize free stream flow or the mass flow of an air stream through the pod interior 20 in order to enhance the torque produced by the hybrid ram air turbine 32, and, in turn, increase power generation. Bernoulli's theorem states that the density of potential energy is proportional to the pressure, whereas the density of kinetic energy is proportional to the square of velocity. Applications where high pressures are available, such as conventional hydro-energy, generally employ turbines in which blade area is maximized to increase torque. Most of the energy in such systems is obtain from potential energy or pressure differential, and efficiency may be increased by increasing blade area which, in turn, decreases velocity of the working fluid and increases pressure. On the other hand, low pressure exists in applications such as in pod 12 mounted to the underside of an aircraft wing traveling at 220 or more knots, at an altitude of 25,000, for example. In these applications, the energy density is mainly kinetic energy and it is paramount to maximize the velocity of the air stream, and avoid pressure buildup, in order to obtain as much torque from the turbine in the system as possible.

Several aspects of this invention contribute to the objective of maximizing the mass flow of the air stream 22 through the pod housing 14. The submerged inlet 26 is effective to resist flow separation of the air stream 22 as it enters the pod interior 20. Flow separation results in flow recirculation which reduces the kinetic energy of the air stream 22 in the course of passage downstream from the submerged inlet 26 to the guide vanes 30 and turbine 32.

Maintenance of the kinetic energy of the air stream 22 as it moves through the pod 12 is also enhanced by creating a pressure drop in the aft portion of the pod interior 20. This pressure drop is induced by both the shape of the turbine housing 72 and the presence of the adjustable exhaust ducts 36. As discussed above, the turbine housing 72 decreases in cross section from its forward end 74 to the aft end 76. The spacing or gap between the outer surface 78 of the turbine housing 72 and the pod housing 14 therefore increases moving in the aft direction causing a pressure drop within the pod interior 20. This pressure drop is enhanced or augmented by moving the exhaust ducts 36 from a closed position to an open position as defined above. As the pressure within the pod interior 20 decreases, the velocity of air stream 22 is maintained or at least is not appreciably reduced. Additionally, the pressure drop or negative pressure created at the aft portion of the pod housing 14 tends to draw the air stream 22 into the pod interior 20.

Other features of this invention also contribute to maintaining or at least not appreciably reducing the kinetic energy of air stream 22. As discussed above, the splitters 106 on the turbine housing 72 are only about 50% to 60% of the length of the blades 104, leaving spaces or open areas 124 in between the blades 104. These open areas 124 resist choking or blockage of the air flow 22 as it passes through the turbine 32 which would otherwise reduce kinetic energy. Additionally, the forward end 112 of each blade 104 is shaped to reduce drag in the direction of rotation of the turbine 32.

Another overall objective of the system 10 of this invention is to extract as much work as possible out of the kinetic energy of air stream 22 so that the torque produced by the turbine 32 is maximized. This objective is met by a combination of the louvers 42, inlet guide vanes 30, turbine blades 104 and splitters 106. While the louvers 42 act as a closure device to open and close the submerged inlet 26, they also function to assist in directing the air stream 22 to the turbine 32 with as little flow separation as possible. An axial flow of the air stream 22 across the blades 104 and splitters 106 is desirable, to the extent possible.

Referring to FIG. 13, a schematic depiction is provided of the air flow 22 in the course of its movement through the inlet guide vanes 30, the blades 104 and the splitters 106. Preferably, the cup-shaped surface 62 of each inlet guide vane 30 forms and angle "D" with an axis 147, one of which is shown in FIG. 13, and each of which is generally parallel to the longitudinal axis of the pod housing 14. Preferably, the angle "D" is in the range of about 22° to 45°. The air stream 22 impacts the surface 62 of each inlet guide vane 30 which deflects it into engagement with the leading surface 146 of each turbine blade 104, as represented by arrow 144, and along the trailing surface 148 thereof as depicted by arrow 150. The air stream 22 is also deflected by the inlet guide vanes 30 into engagement with the leading surface 152 of the splitters 106, as represented by arrow 154. Impact of the air stream 22 with the leading surface 146 of blades 104 and the leading surface 152 of the splitters 106 causes the turbine 32 to rotate, and the magnitude of torque developed is dependent on the kinetic energy of the air stream 22 with which such surfaces 146, 150 are impacted. Additionally, a positive pressure is created along the leading surface 146 of each blade 104 by the air flow represented by arrow 144, and a negative pressure exists along the trailing edge 148 due to the air flow represented by arrow 150. This pressure differential contributes to the torque created by the turbine 32, and, in turn, the power output of the system 10.

It is contemplated that some "tuning" of the system 10 may be desirable to optimize performance. In the embodiment described above with reference to a discussion of FIGS. 7-10, the system 10 may be provided with a means to adjust the angle "D" with which each inlet guide vane 30 is oriented with respect to the axis 147 as noted in FIG. 13. Such adjustment would result in altering the point of impact of the air stream 22, represented by arrows 144, 150 and 154, with the blades 104 and splitters 106, respectively, which may improve performance under certain operating conditions.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, the particular dimensions given for the turbine 32 and blades 104 in connection with a discussion of FIGS. 14-18 are intended for purposes of illustration only. The size of these components, and the other elements of system 10, may be varied according to the application for which the system 10 is intended.

Therefore, it is intended that the invention not be limited to the particular embodiment disclosed as the best mode contemplated for carrying out this invention, but that the invention will include all embodiments falling within the scope of the appended claims.

What is claimed is:

1. A turbine, comprising:
a turbine housing having a forward end, an aft end spaced from said forward end and an outer surface, said turbine housing having a cross section which decreases from said forward end to said aft end;
a number of turbine blades mounted to said outer surface of said turbine housing and being circumferentially spaced from one another, each of said turbine blades extending from said forward end to said aft end of said turbine housing, each of said turbine blades including a blade root located at said outer surface of said turbine housing, a blade tip spaced radially outwardly from said blade root, a forward end located at said forward end of said turbine housing and an aft end located at said aft end of said turbine housing, said space between said blade root and said blade tip defining a height dimension, said height dimension of said turbine blades increasing in a direction from said forward end to said aft end thereof;
a number of splitters mounted to said outer surface of said turbine housing, each of said splitters being located in one of said circumferential spaces between adjacent turbine blades, each of said splitters extending from said forward end of said turbine housing to a termination point spaced from said aft end thereof, each of said splitters including a splitter root located at said outer periphery of said turbine housing, a splitter tip spaced radially outwardly from said blade root, a forward end located at said forward end of said turbine housing and an aft end, said space between said splitter root and said splitter tip defining a height dimension, said height dimension of said splitters increasing in a direction from said forward end to said aft end thereof;
said splitter tips of said splitters and said blade tips of said turbine blades collectively forming a generally cylindrical shape which extends along the entire length of said turbine housing between said forward end and said aft end thereof.

2. The turbine of claim 1 in which each of said turbine blades and said splitters has a length dimension measured in a direction between said forward and aft ends of said turbine housing, said length dimension of said splitters being about half of said length dimension of said turbine blades.

3. The turbine of claim 1 in which an open area is formed along said outer periphery of said turbine housing in between adjacent turbine blades at each termination point of one of said splitters.

4. The turbine of claim 1 in which said turbine housing is generally frusto-conical in shape.

5. The turbine of claim 1 in which said turbine blades function predominantly as an impulse turbine blade.

6. The turbine of claim 1 in which said splitters function predominantly as a reaction turbine blade.

7. A ram air turbine generating apparatus, comprising:
a pod adapted to mount to the wing of an aircraft, said pod including a pod housing having a forward end, an aft end and a pod wall collectively defining a pod interior, said pod interior receiving an air stream which flows in an axial direction from said forward end toward said aft end thereof;
a turbine housing having a first end, a second end spaced in said axial direction from said first end and an outer surface, said turbine housing having a cross section which decreases from said first end to said second end, said turbine housing being mounted within said pod interior in the path of said air stream such that a space is formed between said outer surface of said turbine housing and said pod wall which increases in radial dimension from said first end to said second end of said turbine housing and in a direction toward said aft end of said pod housing, said increasing space between said outer surface of said turbine housing and said pod wall creating a pressure drop within said pod interior in the area of said aft end of said pod housing;
a number of turbine blades mounted to said outer surface of said turbine housing in the path of said air stream and being circumferentially spaced from one another, each of said turbine blades extending from said first end to said second end of said turbine housing, each of said turbine blades having a geometry such that they function predominantly as an impulse turbine blade when impacted by said air stream flowing in an axial direction through said pod interior;
a number of splitters mounted to said outer surface of said turbine housing, each of said splitters being located in one of said circumferential spaces between adjacent turbine blades and in the path of said air stream, each of said splitters extending from said first end of said turbine housing to a termination point spaced from said second end thereof, each of said splitters having a geometry such that they function predominantly as a reaction turbine blade when impacted by said air stream flowing in an axial direction through said pod interior;
a number of inlet guide vanes mounted within said pod interior in the path of said air stream, said inlet guide vanes being effective to direct said air stream into engagement with said turbine blades and with said splitters which collectively function to assist in maximizing the kinetic energy of said air stream in the course of passage through said pod interior.

8. The ram air turbine of claim 7 in which each of said turbine blades includes a blade root located at said outer surface of said turbine housing, a blade tip spaced radially outwardly from said blade root, a forward end located at said first end of said turbine housing and an aft end located at said second end of said turbine housing, said space between said blade root and said blade tip defining a height dimension, said height dimension of said turbine blades increasing in a direction from said forward end toward said aft end thereof.

9. The ram air turbine of claim 8 in which said blade tips of said turbine blades collectively form a generally cylindrical shape which extends along the entire length of said turbine housing between said first end and said second end thereof.

10. The ram air turbine of claim 8 in which each of said splitters includes a splitter root located at said outer periphery of said turbine housing, a splitter tip spaced radially outwardly from said blade root, a forward end located at said first end of said turbine housing and an aft end, said space between said splitter root and said splitter tip defining a height dimension, said height dimension of said splitters increasing in a direction from said forward end to said aft end thereof.

11. The ram air turbine of claim 10 in which said splitter tips of said splitters and said blade tips of said turbine blades collectively form a generally cylindrical shape which extends along the entire length of said turbine housing between said forward end and said aft end thereof.

12. The ram air turbine of claim 7 in which each of said turbine blades and said splitters has a length dimension measured in a direction between said first and second ends of said turbine housing, said length dimension of said splitters being about half of said length dimension of said turbine blades.

13. The ram air turbine of claim 7 in which an open area is formed along said outer periphery of said turbine housing in between adjacent turbine blades at each termination point of one of said splitters.

14. The ram air turbine of claim 7 in which said turbine housing is generally frusto-conical in shape.

15. The ram air turbine generating apparatus of claim 7 in which said number of turbine blades comprises five turbine blades mounted to said outer surface of said turbine housing which are circumferentially spaced from one another.

16. The ram air turbine generating apparatus of claim 15 in which said number of splitters comprises five splitters mounted to said outer surface of said turbine housing each located in one of said circumferential spaces between adjacent turbine blades.

17. A turbine, comprising:
a turbine housing having a forward end, an aft end spaced from said forward end and an outer surface, said turbine housing having a cross section which decreases from said forward end to said aft end;
five circumferentially spaced turbine blades mounted to said outer surface of said turbine housing, each of said turbine blades extending from said forward end to said aft end of said turbine housing, each of said turbine blades including a blade root located at said outer surface of said turbine housing, a blade tip spaced radially outwardly from said blade root, a forward end located at said forward end of said turbine housing and an aft end located at said aft end of said turbine housing, said space between said blade root and said blade tip defining a height dimension, said height dimension of said turbine blades increasing in a direction from said forward end to said aft end thereof;
five splitters mounted to said outer surface of said turbine housing, each of said splitters being located in one of said circumferential spaces between adjacent turbine blades, each of said splitters extending from said forward end of said turbine housing to a termination point spaced from said aft end thereof, each of said splitters including a splitter root located at said outer periphery of said turbine housing, a splitter tip spaced radially outwardly from said blade root, a forward end located at said forward end of said turbine housing and an aft end, said space between said splitter root and said splitter tip defining a height dimension, said height dimension of said splitters increasing in a direction from said forward end to said aft end thereof;
said blade tips of said turbine blades collectively forming a generally cylindrical shape which extends along the entire length of said turbine housing between said forward end and said aft end thereof.

* * * * *